US008504396B2

(12) United States Patent
Quintus et al.

(10) Patent No.: US 8,504,396 B2
(45) Date of Patent: Aug. 6, 2013

(54) FLEXIBLE MAINTENANCE PLANNING

(75) Inventors: Thomas Quintus, Heidelberg (DE);
Sven Krüppel-Berndt, Dielheim (DE);
Moritz Thomas, Walldorf (DE)

(73) Assignee: SAP Aktiengesellschaft, Walldorf (DE)

( * ) Notice: Subject to any disclaimer, the term of this patent is extended or adjusted under 35 U.S.C. 154(b) by 3729 days.

(21) Appl. No.: 10/328,933

(22) Filed: Dec. 24, 2002

(65) Prior Publication Data

US 2004/0138938 A1 Jul. 15, 2004

(51) Int. Cl.
G06Q 10/00 (2006.01)
G06F 7/60 (2006.01)
G06F 17/10 (2006.01)
G06F 19/00 (2006.01)

(52) U.S. Cl.
USPC ............... 705/7.11; 705/7.25; 703/2; 700/99

(58) Field of Classification Search
USPC ............... 705/7.11, 7.25; 703/2; 700/99
See application file for complete search history.

(56) References Cited

U.S. PATENT DOCUMENTS

| 5,710,723 | A | * | 1/1998 | Hoth et al. | ............... | 702/181 |
| 6,067,486 | A | * | 5/2000 | Aragones et al. | ............. | 701/29 |
| 6,192,325 | B1 | * | 2/2001 | Piety et al. | .............. | 702/184 |
| 6,418,361 | B2 | | 7/2002 | Sinex | | |
| 6,442,459 | B1 | | 8/2002 | Sinex | | |
| 6,728,660 | B2 | * | 4/2004 | Bjornson | .................. | 702/185 |
| 6,738,748 | B2 | * | 5/2004 | Wetzer | .................. | 705/9 |
| 6,799,154 | B1 | * | 9/2004 | Aragones et al. | ............. | 703/22 |
| 6,909,992 | B2 | * | 6/2005 | Ashley | ................. | 702/184 |
| 7,016,774 | B2 | * | 3/2006 | Barber et al. | ............... | 701/30 |
| 7,050,953 | B2 | * | 5/2006 | Chiang et al. | ................ | 703/2 |
| 7,133,804 | B2 | * | 11/2006 | Tonack et al. | ............. | 702/184 |
| 7,167,786 | B2 | * | 1/2007 | Sinex | ............... | 701/35 |
| 7,457,762 | B2 | * | 11/2008 | Wetzer et al. | ............. | 705/7.25 |
| 2004/0073468 | A1 | * | 4/2004 | Vyas et al. | ............... | 705/8 |
| 2004/0122722 | A1 | * | 6/2004 | Quintus et al. | ............. | 705/8 |
| 2004/0122723 | A1 | * | 6/2004 | Quintus et al. | ............. | 705/8 |

OTHER PUBLICATIONS

Nancy Brown & Steve Powers, "Simulation in a Box," Proc. 2000 Winter Simulation Conf, pp. 1050-1056 (J.A. Joines et al., eds. 2000).*
Dennis F.X. Mathaisel, "Decision Support for Airline Schedule Planning," 1 J. Combinatorial Optimization 251 (1997).*
Ram Gopalan & Kalyan T. Talluri, "The Aircraft Maintenance Routing Problem," Operations Research, vol. 46, No. 2 (Mar.-Apr. 1998).*

(Continued)

*Primary Examiner* — Jonathan G Sterrett
*Assistant Examiner* — Folashade Anderson
(74) *Attorney, Agent, or Firm* — Blakely, Sokoloff, taylor & Zafi LLP

(57) ABSTRACT

A method and apparatus directed to receiving maintenance demands and historical maintenance data associated with maintenance items are presented. A plurality of models that each define locations, maintenance items, resources, cycles, and average performance is generated, wherein each model represents a hypothetical scenario adjustable by a user so that a model representing one scenario may be compared alongside another model to view the differences in result for various hypothetical scenarios. One or more plans are generated for each model and take into account the received maintenance demands and historical maintenance data. A work package is generated in view of the received maintenance demands and historical maintenance data and the plan.

10 Claims, 13 Drawing Sheets

OTHER PUBLICATIONS

John J. McCall, "Maintenance Policies for Stochastically Failing Equipment: A Survey," Management Science, vol. 11, No., 5 (Mar. 1965).*

David F. Percy et al., "Setting preventive maintenance schedules when data are sparse," 51 Int. J. Production Economics 223 (1997).*

* cited by examiner

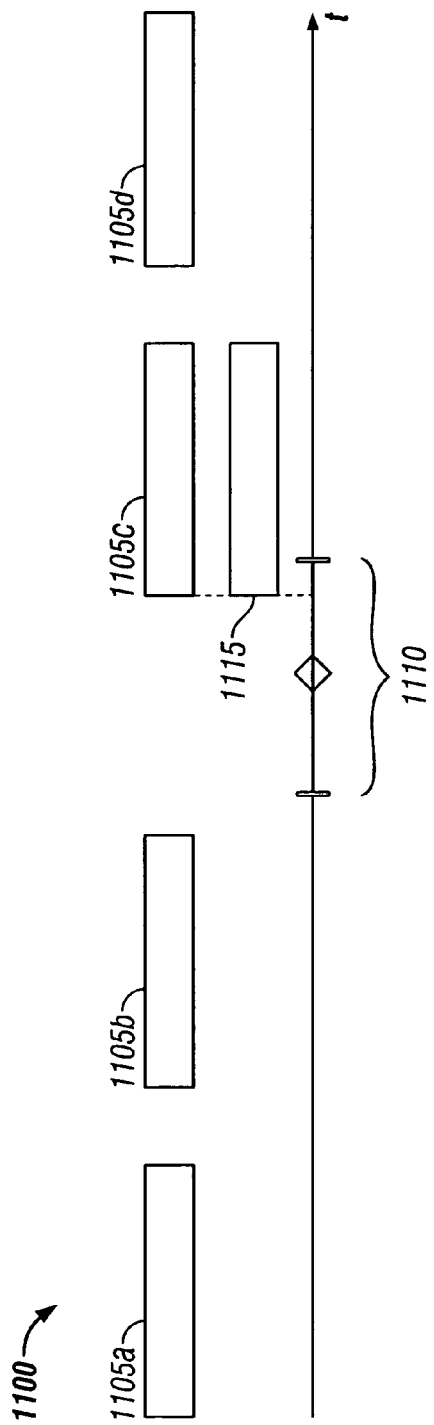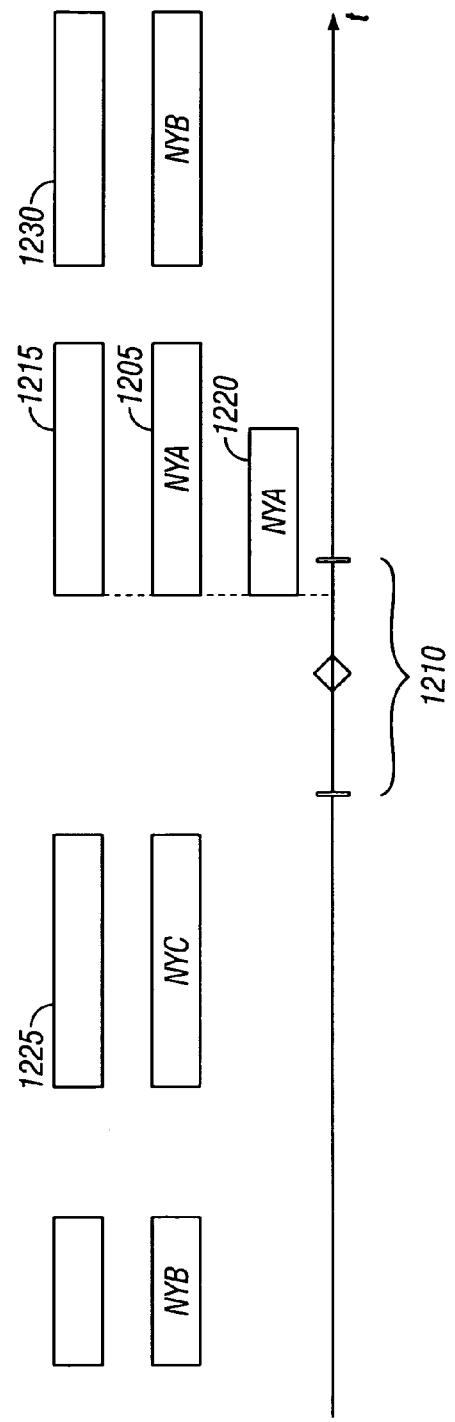

| FIG. 14A |
| FIG. 14B |

FLEXIBLE MAINTENANCE PLANNING

This invention relates to techniques for flexible maintenance planning.

BACKGROUND

An organization that uses a fleet of vehicles in its daily operation must perform maintenance of those vehicles to keep the fleet in operational condition. To keep the daily operations smooth and predictable, the organization typically schedules periodic maintenance of its vehicles so that certain vehicles are taken out of operation at scheduled and predicted times. This allows the organization to accommodate their operations to account for the out-of-operation vehicles. When the vehicles include a regulated vehicle, such as an aircraft, certain periodic maintenance is required to keep the vehicle in compliance with the regulations.

SUMMARY

The present application describes the combination of an operational maintenance scheduling system with a planning system that models and simulates different scenarios. This combined system allows for flexibly planning and changing maintenance plans based on future business goals and seamlessly incorporating accepted plans into the daily operations of an enterprise. In one aspect there is a method that includes receiving maintenance demands associated with maintenance items and receiving historical maintenance data associated with the maintenance items. The method further includes generating a model including locations and resources, generating a plan based on the maintenance demands, the historical maintenance data, and the model and generating work packages based on the maintenance demands, the historical maintenance data and at least a portion of the plan.

In other examples, the method can also include transmitting the maintenance demands and the historical maintenance data from a requirements manager to a planning manager and transmitting the at least a portion of the plan to the requirements manager. The method can also include generating a user interface to enable a user to view at least a portion of the plan. The method can also include generating a user interface to enable a user to view at least a portion of the model. The method can also include modifying the model by changing at least one of the at least a portion of the maintenance items, resources and locations. The method can also include generating a user interface to enable a user to modify the model.

The method can also include modifying the plan by changing at least one of the maintenance demands, the historical maintenance data, and the model. The method can also include modifying the plan by changing at least one of a start date and an end date. The method can also include generating a user interface to enable a user to modify the plan. The method can also include revising one or more of the work packages based on a modification to the plan. The method can also include receiving an operating schedule of each maintenance item, the operating schedule including geographical locations.

The plurality of maintenance items can include aircraft. The locations can include aircraft bays. The resources can include avionics personnel, painters, and mechanics.

In another aspect, there is a system including a requirements manager and a planning manager. The requirements manager includes a maintenance requirements repository, a maintenance history repository, and a work package generator. The maintenance requirements repository has a plurality of respective maintenance demands for a plurality of maintenance items. The maintenance history repository has a plurality of respective historical maintenance data for the plurality of maintenance items. The work package generator is configured to generate work packages associated with the plurality of maintenance items based on the maintenance demands and the historical maintenance data. The planning manager in communication with the requirements manager. The planning manager includes a model generator and a planning engine. The model generator is configured to generate a model including at least a portion of the maintenance items, resources and locations. The planning engine is configured to receive the maintenance demands and the historical maintenance data, to generate a plan based on the maintenance demands, the historical maintenance data, and the model, and to transmit at least a portion of the plan to the work package generator.

In other examples, the planning manager can also include a user interface configured to enable a user to modify parameters associated with the model. The parameters can be associated with one or more maintenance items, resources, locations, and utilization. The planning manager can further include a user interface configured to enable a user to modify parameters associated with the planning engine. The parameters can be associated with a start date of the plan and an end of the plan. The planning engine can further include a revisions generator configured to format the portion of the plan into revisions to work packages.

The requirements manager can further include an operations manager configured to determine an operating schedule of each maintenance item, the operating schedule including geographical locations. The plurality of maintenance items can include aircraft. The locations can include aircraft bays. The resources can include avionics personnel, painters, and mechanics.

In another aspect, there is a method including identifying a packaging type maintenance demand including a valid date range, determining a maintenance item associated with the packaging type maintenance demand, and determining one or more assigned slots associated with the maintenance item, each slot including a respective date range. The method further includes selecting one slot from the determined one or more assigned slots, the selected one slot having a respective date range that is compatible with the valid date range and combining a first set of maintenance tasks associated with the packaging type maintenance demand with a second set of maintenance tasks associated with the selected one slot.

In other examples, the method can also include generating a work package including the first set of maintenance tasks and the second set of maintenance tasks. The maintenance item can include an aircraft and/or an aircraft component. The method can also include identifying a major type maintenance demand associated with the maintenance item, determining an interval associated with the major type maintenance demand and determining the assigned slots associated with the major type maintenance demand based on the interval and locations to generate the respective date range. The locations can include aircraft bays. The method can also include identifying a minor type maintenance demand associated with the maintenance item, determining an interval associated with the minor type maintenance demand and determining the assigned slots associated with the minor type maintenance demand based on the interval and locations to generate the respective date range.

In another aspect, there is a system with a planning engine. The planning engine is configured to receive a packaging type maintenance demand including a valid date range, to determine an maintenance item associated with the packaging type maintenance demand, to determine one or more assigned slots associated with the maintenance item, each slot including a respective date range, to select one slot from the determined one or more assigned slots, the selected one slot having a respective date range that is compatible with the valid date range, and to combine a first set of maintenance tasks associated with the packaging type maintenance demand with a second set of maintenance tasks associated with the selected one slot.

In other examples, the planning engine can be further configured to generate a work package including the first set of maintenance tasks and the second set of maintenance tasks. The maintenance item can include an aircraft and/or an aircraft component. The planning engine can be further configured to receive a major type maintenance demand associated with the maintenance item, to determine an interval associated with the major type maintenance demand and to determine the assigned slots associated with the major type maintenance demand based on the interval and locations to generate the respective date range. The locations can include aircraft bays.

The planning engine can be further configured to receive a minor type maintenance demand associated with the maintenance item, to determine an interval associated with the minor type maintenance demand, and to determine the assigned slots associated with the minor type maintenance demand based on the interval and locations to generate the respective date range.

In another aspect, there is a method including defining a first planning object having a first value associated with an out of compliance parameter, a second value associated with a maximum utilization parameter, the second value being less than the first value, a third value associated with a minimum utilization parameter, the third value being less than the second value, and a fourth value associated with a target utilization value, the fourth value being less than the second value and greater than the third value and indicating when a maintenance demand is due. The method further includes determining whether a slot exists for the maintenance demand where the slot comprises a start date between the second and third values, inclusive.

In other examples, the method can also include determining whether a slot exists comprising a start date equal to the fourth value, determining whether a slot exists comprising a start date between the fourth value and the second value, inclusive, if no slot exists comprising a start date equal to the fourth value, and determining whether a slot exists comprising a start date between the third value and the fourth value, inclusive, if no slot exists comprising a start date between the fourth value and the second value, inclusive. The method can also include generating an alert if no slot exists comprising a start date between the second value and the third value, inclusive.

The method can also include determining the fourth value based on an interval and an end date of a previously scheduled maintenance order. The method can also include determining the first value based on a regulatory requirement. The regulatory requirement can be associated with an aircraft regulating authority. The method can also include determining the second and third values based on customer accepted tolerances for utilization. The ratios of the second value to the first value, the third value to the first value and the fourth value to the first value can be fixed.

In another aspect, there is a system a storage device and a planning engine. The storage device can be permanent or persistent. The storage device includes a first planning object having a first value associated with an out of compliance parameter, a second value associated with a maximum utilization parameter, the second value being less than the first value, a third value associated with a minimum utilization parameter, the third value being less than the second value, and a fourth value associated with a target utilization value, the fourth value being less than the second value and greater than the third value and indicating when a maintenance demand is due. The planning engine is configured to determine whether a slot exists for the maintenance demand where the slot comprises a start date between the second and third values, inclusive.

In other examples, the planning engine can be further configured to determine whether a slot exists comprising a start date equal to the fourth value, to determine whether a slot exists comprising a start date between the fourth value and the second value, inclusive, if no slot exists comprising a start date equal to the fourth value, and to determine whether a slot exists comprising a start date between the third value and the fourth value, inclusive, if no slot exists comprising a start date between the fourth value and the second value, inclusive. The planning engine can be further configured to generate an alert if no slot exists comprising a start date between the second value and the third value, inclusive.

The planning engine can be further configured to determine the fourth value based on an interval and an end date of a previously scheduled maintenance order. The planning engine can be further configured to determine the first value based on a regulatory requirement. The regulatory requirement can be associated with an aircraft regulating authority. The planning engine can be further configured to determine the second and third values based on customer accepted tolerances for utilization. The ratios of the second value to the first value, the third value to the first value and the fourth value to the first value can be fixed.

In another aspect, there are articles comprising a machine-readable medium storing instructions operable to cause one or more machines to perform operations comprising one or more of the methods and variations described above.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

FIG. 11 shows a block diagram of a process for scheduling minor type orders.

FIG. 12 shows a block diagram of a process for scheduling packaging type orders.

Like reference symbols in the various drawings indicate like elements.

DETAILED DESCRIPTION

Figure 1:
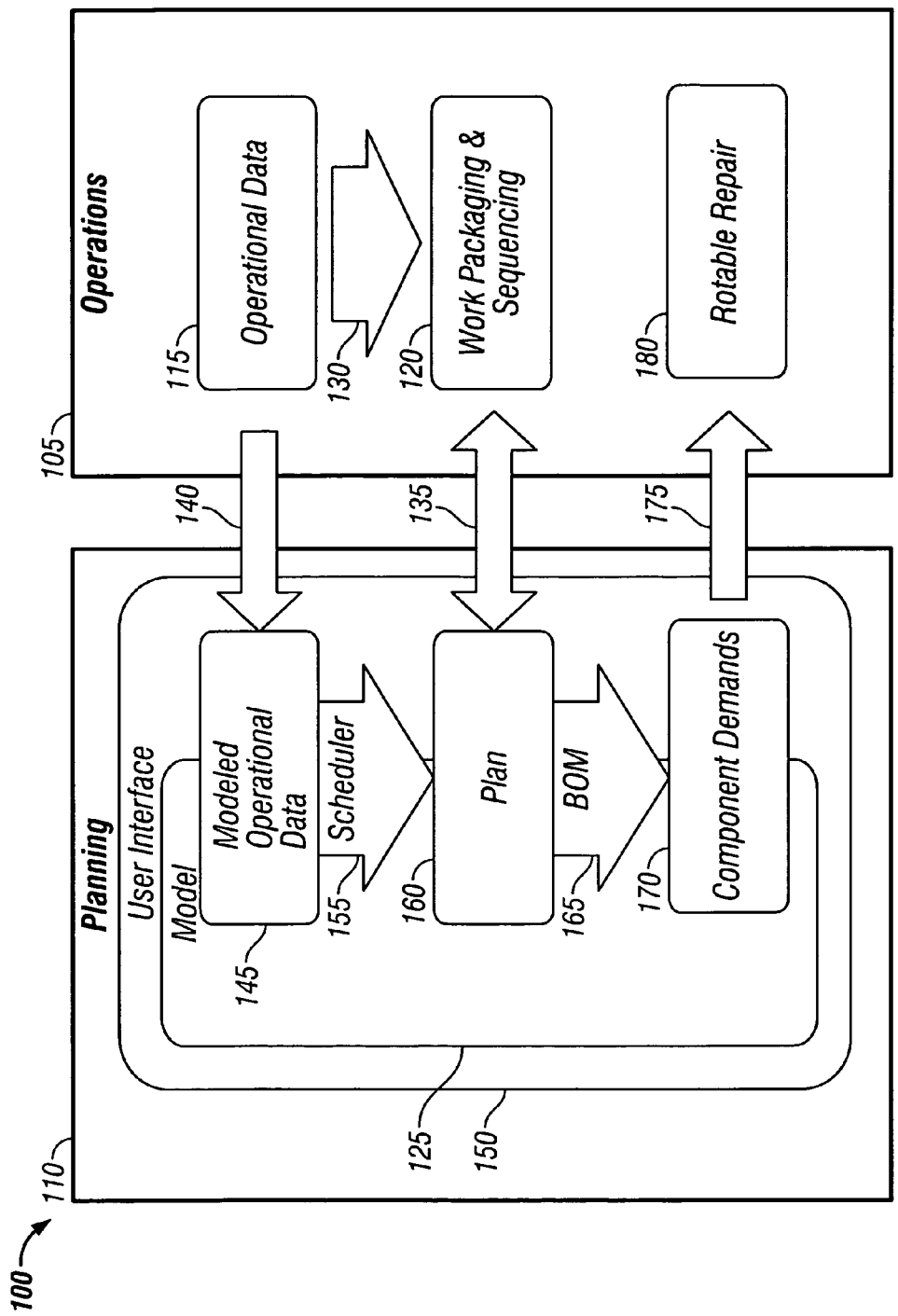
FIG. 1 shows a block diagram of a maintenance planning system.

FIG. 1 illustrates a maintenance planning system ("MPS") 100. MPS 100 includes the combination of an operations system 105 and a planning system 110. The systems 105 and 110 can operate on the same device and communicate with each other using one or more communication channels (e.g., represented by arrows 135, 140 and 175). Alternatively, the systems 105 and 110 can operate on different devices communicating with each other over one or more communication channels of a network (not shown, but represented, for example, by arrows 135, 140 and 175). In combining operations system 105 with planning system 110, MPS 100 models what-if scenarios based on actual operational data 115, allowing the user to vary any parameter to generate different plans, both short-term (e.g., 12-18 months) and long-term (e.g., 5 years). Further, MSP 100 transmits near-term data (e.g., relating to the next 3 months) from an active plan generated by planning system 110 back to operations system 105 so that a work package generator 120 can seamlessly and automatically generate work packages for actual enterprise entities (e.g., maintenance items, facilities, resources) based on that active plan.

In general overview, operations system 105 tracks and manages the daily operations data 115 of an enterprise. Based on the operations data 115, work package generator 120 of operations system 105 generates work packages involving specific entities of the enterprise. Operations system 105 manages the specific entities of the enterprise but typically does not allow for the input of hypothetical entities, as work packages correspond to actual enterprise entities. Planning system 110 simulates operational data using a model 125 and generates varying plans based on varying parameters. A user can vary any parameter and generate many what-if scenarios because planning system 110 can accept hypothetical entities. Planning system 110 also includes optimizing techniques, as described in more detail below, that package maintenance tasks and define tolerance windows that allow more flexibility in generating plans compliant with all of the necessary maintenance requirements.

In more detail, operations system 105 has operational data 115 on the specific aspects of maintenance for the enterprise. Operations system 105 stores this data 115 in repositories (not shown) accessible by operations system 105. For example, operations system 105 has data 115 regarding all of the maintenance items within the enterprise requiring maintenance, such as aircraft and aircraft components, the maintenance that is required for each maintenance item, such as A-checks and C-checks, a historical profile on the maintenance previously performed, such as the completion date of the last maintenance and/or counter values (e.g., flying hours, landing cycles and the like), and the tasks needed to perform the required maintenance. The tasks are defined in a task list and include the activities (e.g., individual steps) of the listed tasks, the components associated with the listed tasks, and the resources (e.g., mechanic man-hours, painter man-hours, avionics man-hours) needed to complete the listed tasks.

Operations system 105 transmits (arrow 130) operational data 115 to work package generator 120 as maintenance requirements become due or near-term. Work package generator 120 generates a work package in response to the due or near-term requirements, based on operational data 115. Work package generator 120, as part of the generation process, queries (arrow 135) planning system 110 to retrieve any revisions from planning system 110 corresponding to the work package.

To generate a plan, planning system 110 retrieves (arrow 140) the operational data 115 from operations system 105 and generates modeled operational data 145. Modeled operational data 145 includes the same data structures as the operational data 115. It is referred to as modeled data, however, because planning system 110 can modify the data to plan various what-if scenarios, including variances to operational data 145. Modeled operational data 145 can include additional planning parameters to accommodate the variances. For example, a validity parameter can be used to indicate what dates certain model operations data objects are valid. This can be used, for example for including in the plan, an anticipated requirements change being discussed by an aircraft regulatory authority that will be implemented in the future. A user can vary the modeled operational data 145 using user interface 150. As illustrated, user interface 150 enables a user to access all of the components of the planning system 110.

Model 125 includes, among other data structures, objects to represent the resources and facilities within the enterprise that are available to perform the required maintenance. Inserting the operational data 145 into the model 125, a scheduler 155 generates a plan 160 based upon a set of values for model 125. Scheduler 155 includes its own parameters to define aspects of the plan, such as an end date for the plan. For example, scheduler 155 can generate a plan over one year, a plan over two years, a plan over five years and the like. Planning system 110 transmits (arrow 135) portions of plan 160 in which work package generator 120 has interest to work package generator 120, in response to the query sent from work package generator 120, described above. From plan 160, a bill of materials component 165 generates a component demand 170. As described above, a maintenance task list includes the components needed to perform a maintenance task. Planning system 110 also transmits (arrow 175) the component demand to a rotable repair manager 180.

Figure 2:
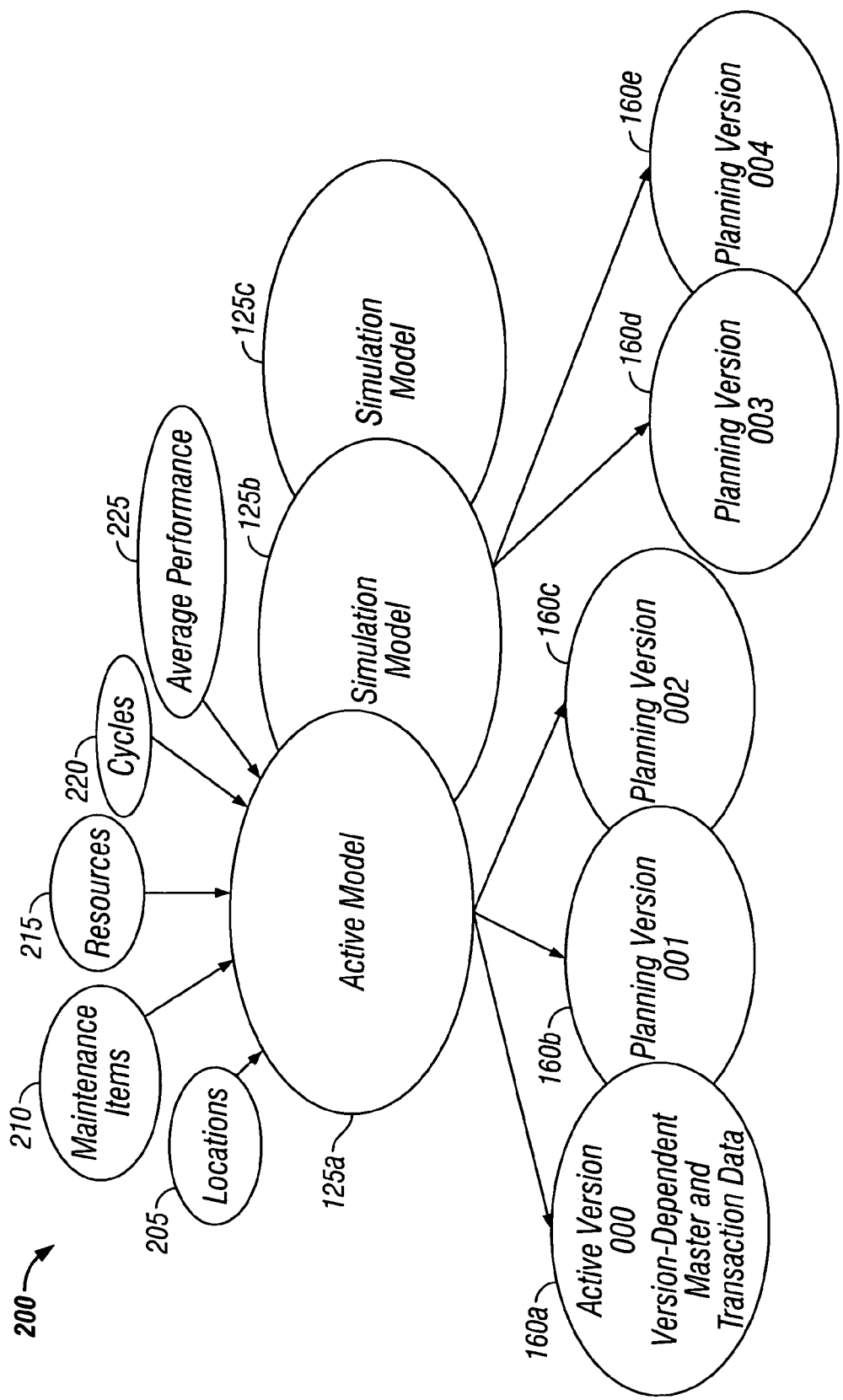
FIG. 2 shows a block diagram of modeling and plan generation.

FIG. 2 illustrates the modeling process 200 of planning system 110 in more detail. To generate model 125, planning system 110 uses several inputs, which may or may not be part of the modeled operational data 145. FIG. 2 illustrates five example inputs. One input is locations data 205. Locations data 205 represent the geographical locations of resources available to perform the maintenance operations. For example, airline ABC has maintenance bays at airports in Newark, Atlanta, Chicago and London, so these four locations are instances of locations data 205. Another input is maintenance items data 210. Maintenance items data 210 represent those maintenance items requiring maintenance. For example, maintenance items data 210 represent aircraft and aircraft components that require maintenance. Specific instances can include aircraft type, such as A320, A340, B757, and the like, and certain aircraft components requiring periodic and/or planned maintenance, such as engines, landing gear and the like. Maintenance items data 210 are typically part of the modeled operational data 145, derived from operational data 115 that represents actual entities of the enterprise. As described above, making maintenance items data 210 part of model 125, a user can generate a plan 160 that includes hypothetical aircraft, for example to determine the effect that adding or removing an aircraft will have on the current maintenance plan.

Another input is resources data 215. Resources data 215 represent the resources available to perform the maintenance operations. For example, resources can include the bays and the personnel (e.g., mechanics, painters, avionics and the like) available to service aircraft. Another input is cycles data 220. Cycles data 220 represent the intervals required between checks. For example, the regulatory authority may require A-checks every 100 flight hours and B-checks every 300 hours. Another input is average performance data 225. Average performance data 225 represent average flight performance of a certain aircraft. For example, airline ABC may average 100 flight hours per week for all of it's A320 fleet. The average performance data 225 allows planning system 110 to model requirements that are based on counter values, such as flight hours, as calendar time maintenance demands. This modeling allows scheduler 155 to schedule a calendar time slot for the demand.

Figure 3:
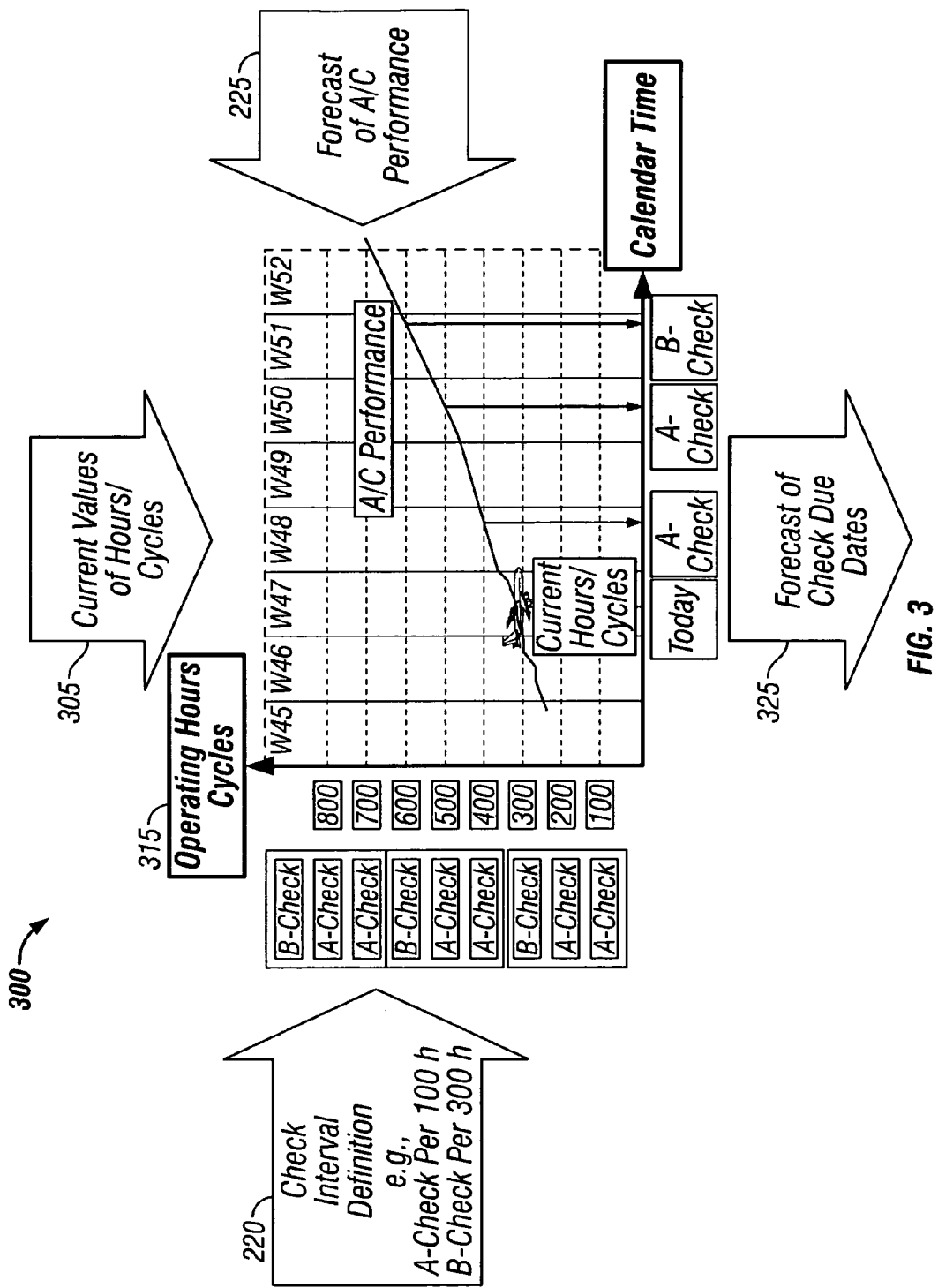
FIG. 3 shows a block diagram of a modeling maintenance demands.

FIG. 3 illustrates a graph 300 representing modeling of maintenance demands associated with periodic checks for a particular aircraft to forecast future demands for scheduler 155 to schedule via calendar dates. Graph 300 represents the data that planning system 110 generates and that data is part of model 125 used by scheduler 155 to generate a plan 160. Two inputs to graph 300 are the cycles data 220 and the average aircraft performance data 225 described above. Another input is the historical data 305 associated with the particular aircraft with which portion 300 is associated. As described above, historical data 305 includes counter values (e.g., flying hours, landing cycles and the like), and is part of the operational data 115.

To generate the data represented by graph 300, planning system 110 obtains the current counter value from data 305 and associates that value with today's date. Planning system 110 determines the data represented by line 310 using the average hours per day/week from the average performance data 225 to determine a slope of line 310 and starting line 310 with the determined slope at today's date with the current counter value. Planning system 110 determines the hours at which maintenance demands are due (represented on axis 315) using data 220. Using the data represented by line 310 and the required demands represented on axis 315, planning system 110 determines the dates (represented on axis 320) of the required demands (i.e., calendar time). This modeling now allows scheduler 155 to schedule the required demands by date data 325.

Referring back to FIG. 2, modeling process 200 includes three models. Models 125a, 125b, and 125c represent the variations of one or more parameter values of inputs 205, 210, 215, 220 and 225. For example, model 125a represents a particular state, or instance of inputs 205, 210, 215, 220 and 225 with specific values. Model 125b represents a change to the particular state or instances of inputs 205, 210, 215, 220 and 225. This can include changes to the values of the parameters of the included instances of inputs 205, 210, 215, 220 and 225 (e.g., change the interval of B-check from 300 flight hours to 350 flight hours) and/or additional or alternative instances of inputs 205, 210, 215, 220 and 225 (e.g., increase the number of B757 aircraft from 8 to 10). Similarly, model 125c represents yet another change to the particular state or instances of inputs 205, 210, 215, 220 and 225. In other words, these models 125a-c represent the different what-if scenarios of interest to a user.

Scheduler 155 generates plans 160a-e using these models 125a-c. For example, plans 160a, 160b, and 160c can represent one-year, two-year, and five-year plans, respectively, of model 125a. Similarly, plans 160d and 160e can represent one-year and two-year plans, respectively, of model 125b. To handle queries by work package generator 120, planning system 110 indicates one model (e.g., 125a) and one plan associated with that model (e.g., 160a) as active. By doing so, planning system 110 selects applicable portions of the currently active plan (e.g., 160a) to transmit back to work package generator 120.

Figure 4:
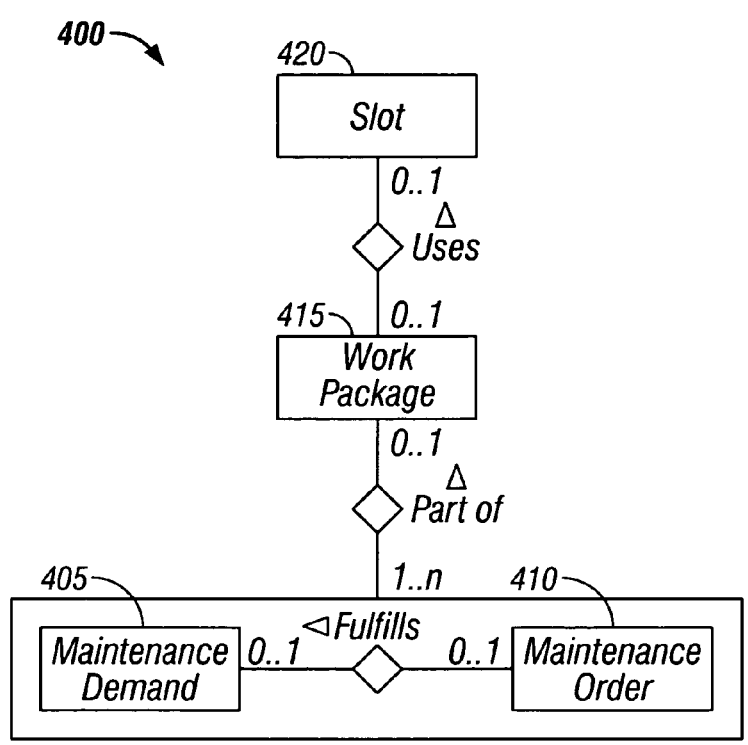
FIG. 4 shows a block diagram of a model data structure.

FIG. 4 illustrates a data model 400 of planning objects that scheduler 155 employs to generate a plan 160. Data model 400 includes a maintenance demand 405, a maintenance order 410, a work package 415, and a slot 420. Maintenance demand 405 represents a particular maintenance requirement that has to be carried out for an individual aircraft and/or aircraft component. As such, a maintenance demand 405 includes information about the individual aircraft and/or aircraft component with which it is associated. Maintenance demand 405 also includes information about its due date, represented as a time range. This time range is based on the date where utilization is 100% (i.e., the never exceed period ("NEP") after which the aircraft is out-of-compliance), the end date of the last planned maintenance order, and the minimum and maximum utilization set by a user. These parameters define a tolerance window that includes an earliest start date, a target start date, a latest start date, and a NEP date. Maintenance demand 405 also includes information about associated maintenance tasks and their durations. Planning system 110 calculates a maintenance demand by maintenance cycle definitions based on counter values or, as described above, by calendar time.

Maintenance order 410 represents a particular maintenance task list that has to be carried out for individual aircraft and/or aircraft component and has been assigned to a specific location for a certain time interval. As shown by the relationship, maintenance order 410 fulfills maintenance demand 405. Maintenance order 410 includes information about the aircraft and/or aircraft component with which it is associated. Maintenance order 410 also includes information about a scheduled start date, a scheduled end date, a corresponding maintenance demand, an associated task list, and allocated resources. As described in more detail below, scheduler 155 packages maintenance order 410 together when applicable. Scheduler 155 generates a maintenance order 410 based on available resources and associated task lists. A user can also generate and/or modify maintenance order 410 using user interface 150.

Figure 5:
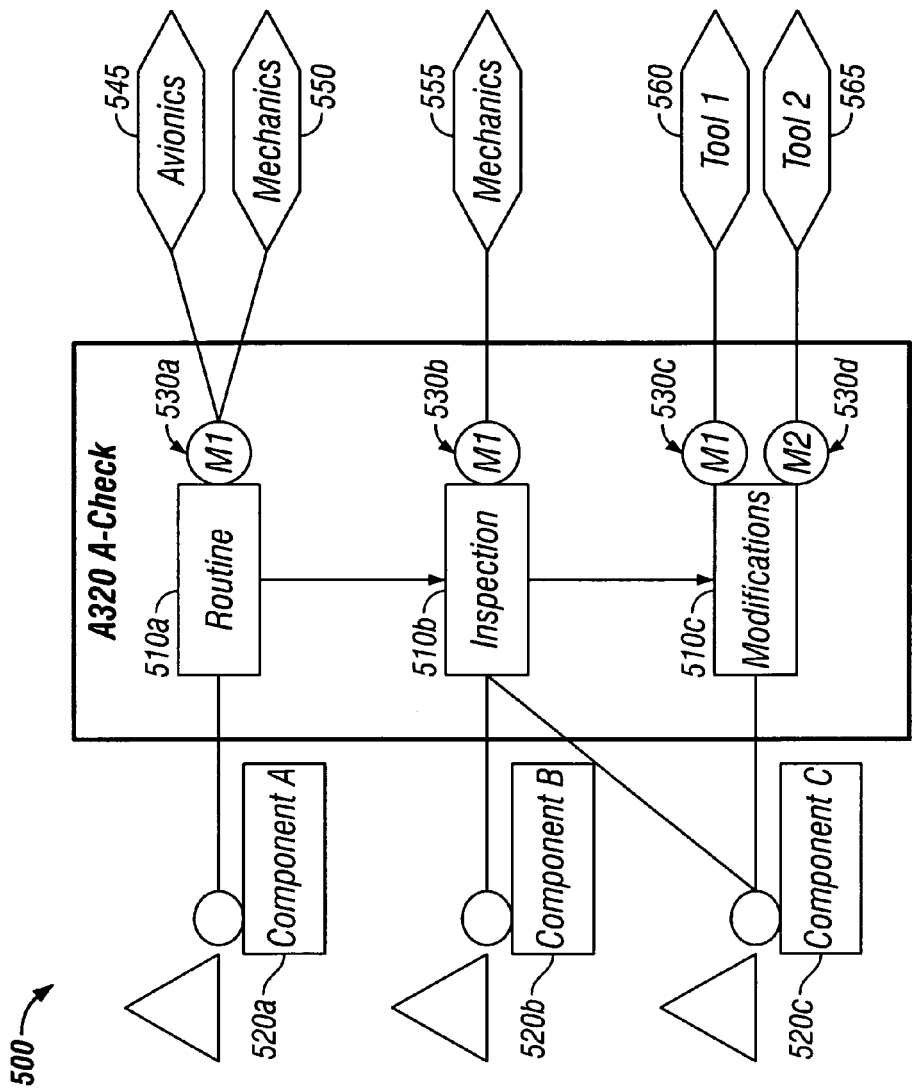
FIG. 5 shows a block diagram of another model data structure.

Both maintenance demand 405 and maintenance order 410 are associated with a task list. FIG. 5 illustrates a data model 500 of a task list. As described above, task list 500 includes associated activities 510a-c, components 520a-c, and resources 530a-d. Task list 500 represents an A-check for an A320 aircraft. Activities 510 required for the A320 A-check include a routine 510a, an inspection 510b, and modifications 510c. Routine 510a includes information about the duration of routine 510a. Routine 510a uses, and requires with regard to component demand 170, component A 520a. Routine 510a uses resources 530a to complete routine 510a. Resources 530a include resource types avionics 545 and mechanics 550. Resource types avionics 545 and mechanics 550 include information about the quantity of each resource required to perform routine 510a. Inspection 510b includes information about the duration of inspection 510b. Inspection 510b uses, and requires with regard to component demand 170, component B 520b, and component C 520c. Inspection 510b uses resources 530*b* to complete inspection 510*b*. Resources 530*b* include resource type mechanics 555. Resource type mechanics 555 includes information about the quantity of the resource required to perform inspection 510*b*. Modifications 510*c* include information about the duration of modifications 510*c*. Modifications 510*c* use, and require with regard to component demand 170, component C 520*c*. Modifications 510*c* use resources 530*c* and 530*d* to complete modifications 510*c*. Resource 530*c* includes resource type tool1 560. Resource 530*d* includes resource type tool2 565. Resource types tool1 560 and tool2 565 include information about the quantity of each resource required to perform modifications 510*c*.

Task list data model 500 represents a task list model employed by the planning system 110. This task list model 500 is an aggregate of a corresponding operational task list that work package generator 120 employs to generate work packages for enterprise personnel. For example, the operational task list includes each of the individual tasks (activities) that a single employee performs. This operational task list can therefore include well over one hundred times the activities represented by data model 500. For planning purposes, planning system 110 uses the aggregate of the activities to obtain an accurate duration and the aggregate of the resources to obtain an accurate quantity of needed resources.

Referring back to FIG. 4, work package 415 represents a group of one or more maintenance orders 410 that maintenance personnel perform together on the same aircraft on the same maintenance line (e.g., bay). Work package 415 includes information about its duration. The start date of the duration is the start date of the first maintenance task associated with the associated maintenance orders 410. Similarly, the end date is the end date of the last maintenance task associated with the associated maintenance orders 410. Slot 420 represents a time interval on a specific aircraft bay reserved for specific checks and/or a specific group of aircraft (e.g. C-checks for A320 aircraft scheduled for long distance flights). Physically, one bay accommodates one aircraft, so only one slot order can reserve aircraft bay space at one point of time. One or more maintenance orders can be assigned to a slot. Scheduler 155 creates slot 420 using a slot task list.

Figure 6:
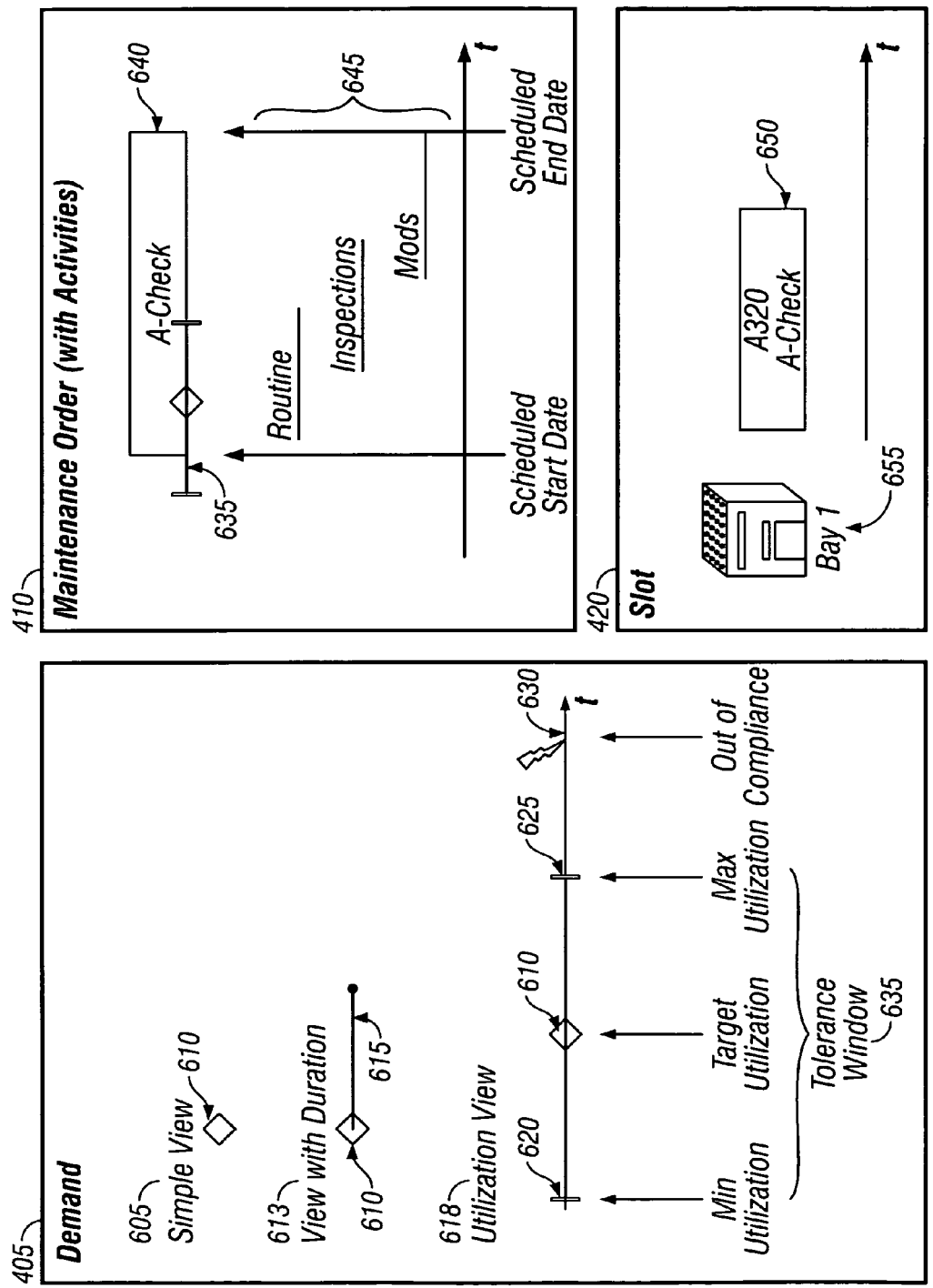
FIG. 6 shows a block diagram of graphical representations of data structures.

FIG. 6 illustrates graphical representations of maintenance demand 405, maintenance order 410, and slot 420. The graphical representations are used in other figures of this specification and can also be used in user interface 150. For the maintenance demand 405, there are three views. Simple view 605 includes a diamond 610 that indicates the target start date for the demand 405. View 613 includes a diamond 610 that indicates the target start date for the demand 405 and a duration 615 representing the duration of the demand 405, based on, for example, an estimated value in the planning parameters. Utilization view 618 includes a diamond 610 that indicates the target start date for the demand 405. View 618 also includes a minimum utilization date 620, a maximum utilization date 625, and an out-of-compliance date 630, together which define a tolerance window 635.

The view for maintenance order 410 includes an associated task list 640, a defined tolerance window 635 associated with the maintenance demand 405 to which the maintenance order 410 corresponds, and a list of activities 645 associated with the task list 640. The length of the task list block 640 corresponds to the duration of the task list. The view for slot 420 includes an associated task list 650 and a bay resource 655 with which the slot 420 is associated. The length of task list block 650 corresponds to the duration of the task list.

Figure 7:
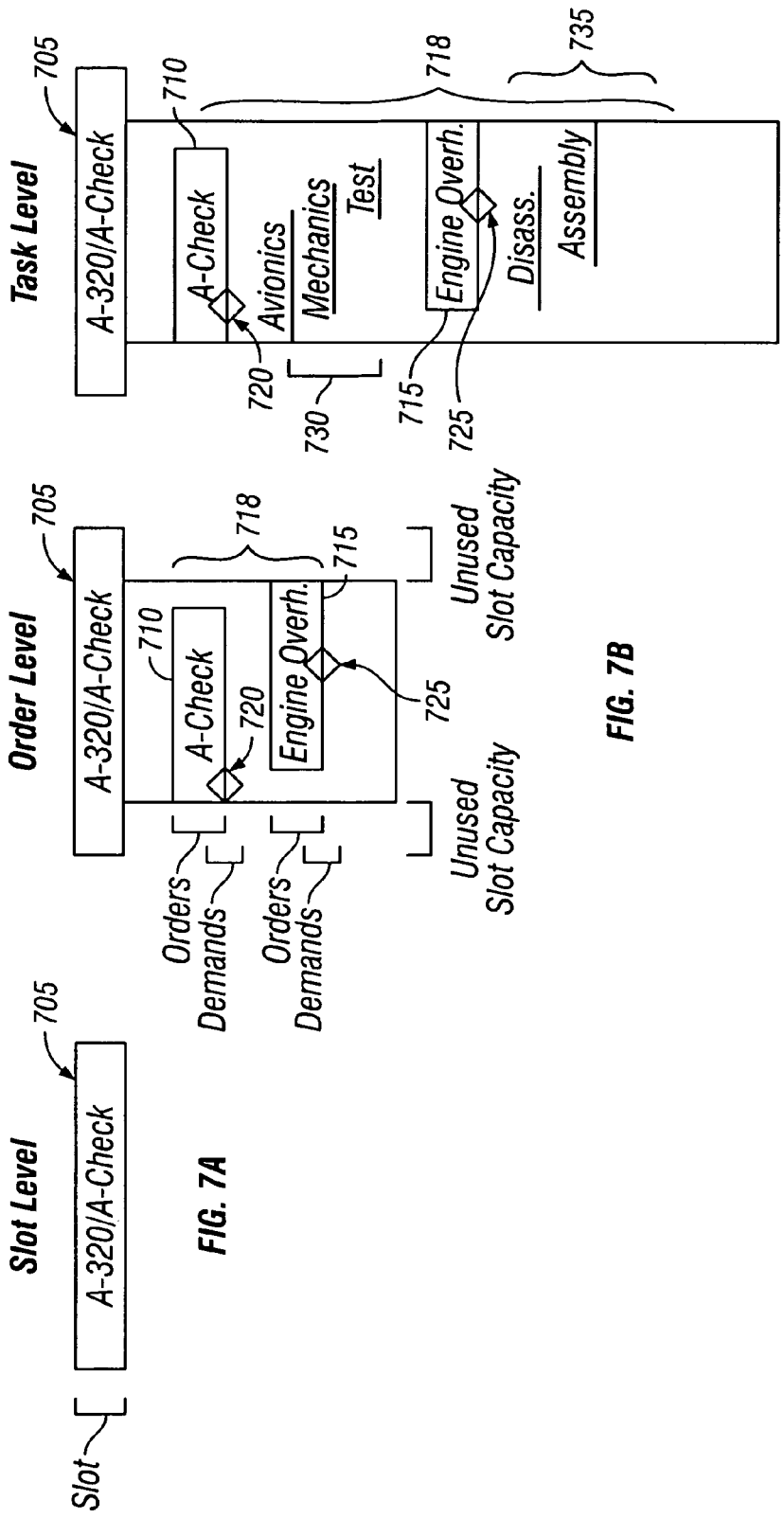
FIGS. 7A, 7B, and 7C show block diagrams of additional graphical representations of data structures at various levels of detail.

FIGS. 7A-C illustrates graphic representations of scheduled maintenance tasks on various levels. FIG. 7A illustrates a scheduled slot 705. FIG. 7B further illustrates the scheduled slot 705 with maintenance orders 710 and 715 that have been associated with slot 705. The combination of maintenance orders 710 and 715 represent a work package 718 that uses slot 705. Diamonds 720 and 725 indicate the target start dates (e.g., due date of forecasted demand based on cycle definition and date of previous maintenance order (demand)) for maintenance demands associated with maintenance orders 710 and 715, respectively. FIG. 7C further illustrates the scheduled slot 705 with activities 730 and 735 corresponding to maintenance orders 710 and 715, respectively. As described above, task lists associated with the maintenance orders 710 and 715 define the activities 730 and 735, respectively. Scheduler 155 defines the start/end date of slot 705 using a parameter defined external to planning system 110 (e.g. by periodic slot pattern) or using a target date of a maintenance demand (e.g., 720 and 725). Scheduler 155 defines the start date of orders 710 and 718 using the scheduled start date of the earliest activity (e.g., earliest activity of activities 730 for order 710 and earliest activity of activities 735 for order 715). Similarly, scheduler 155 defines the end date of orders 710 and 718 using the scheduled end date of last activity (e.g., last activity of activities 730 for order 710 and last activity of activities 735 for order 715). Scheduler 155 defines the start date of work package 718 using the scheduled start date of the earliest order (e.g., earliest order of orders 710 and 715). Similarly, scheduler 155 defines the end date of work package 718 using the scheduled end date of the last order (e.g., last order of orders 710 and 715).

Figure 8:
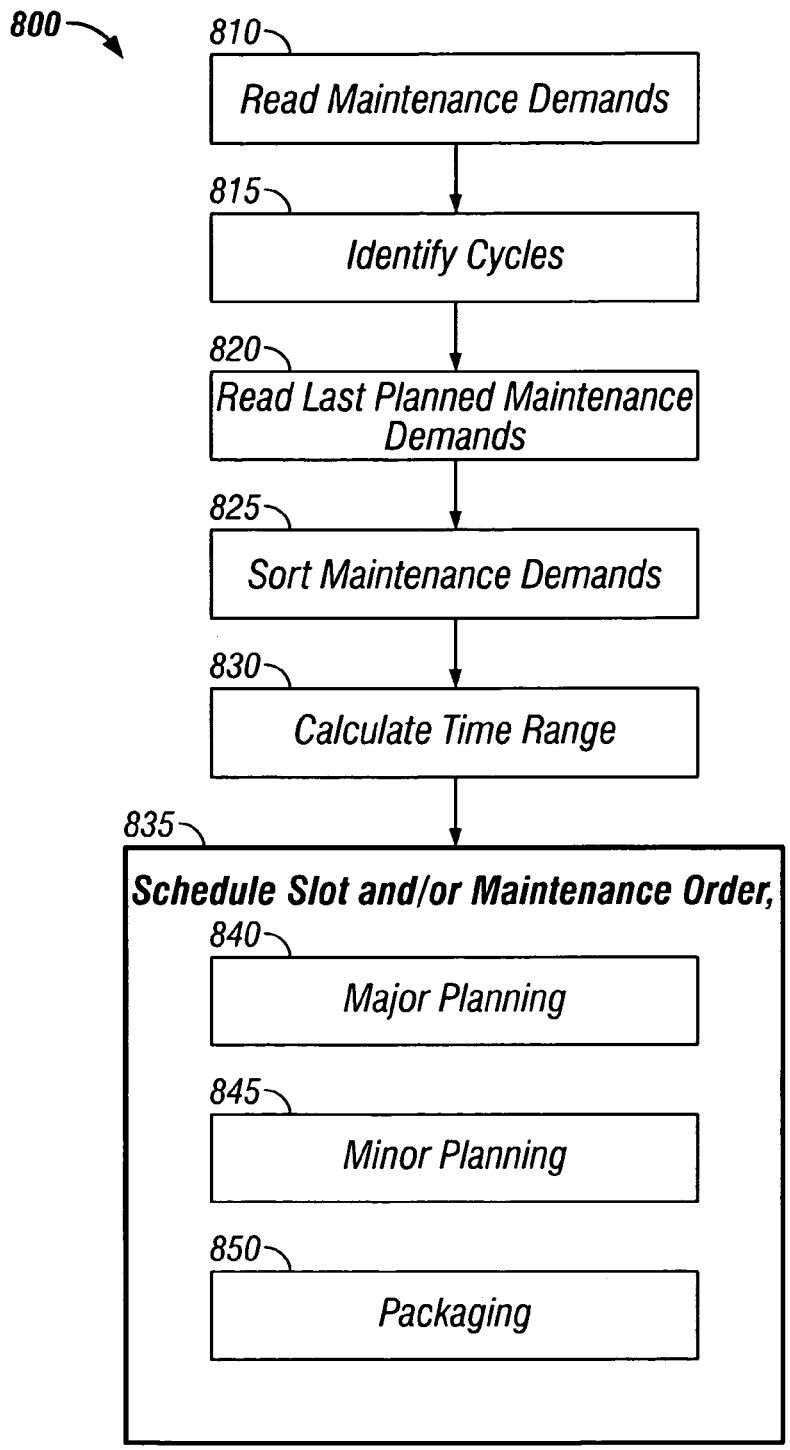
FIG. 8 is a flowchart showing a process for generating a plan.

FIG. 8 illustrates an example process 800 scheduler 155 uses to generate a plan 160. To start a planning run a user defines a planning selection and the planning strategy. The planning selection defines which maintenance demands of which maintenance items and to which time horizon should be planned. Planning strategy values can include 'New plan' and 'Net-change plan'. 'New plan' plans all maintenance demands within the specified planning selection. 'Net-change plan' plans only unplanned or changed maintenance demands. According to the specified planning selection and planning strategy, scheduler 155 reads (810) maintenance demands to be planned. These demands can be for example the demand data 325 (FIG. 3), which associates demands with calendar dates. Scheduler 155 groups maintenance demands by their maintenance cycles. Because it is possible to create maintenance demands manually, maintenance demands without a maintenance cycle can also exist. Scheduler 155 schedules these individually in a separate 'no cycle' group.

Scheduler 155 identifies (815) cycles of the required demands associated with a particular aircraft. Maintenance cycles might exist that have to be planned (according to the specified planning selection) and that have not yet created maintenance demands (within the specified planning horizon). For example, demands may only extend for one year, but the planning selection may indicate that scheduler 155 needs to generate a two-year plan. Therefore, scheduler 155 has to check whether there are additional cycles according to the given planning selection. If so, scheduler 155 generates additional demands to be scheduled within the two-year plan.

For each identified maintenance cycle, scheduler 155 reads (820) the last planned maintenance demand prior to the newest maintenance demand to be planned (within the planning horizon). This last planned maintenance demand serves as the starting point for scheduling the subsequent maintenance demand due dates. Scheduler 155 sorts (825) the maintenance demands into two groups. Scheduler 155 sorts (825) maintenance demands with planning type packaging into a package group and all other maintenance demands (e.g., with planning types major and minor) into a slot group. Scheduler 155 sorts (825) the maintenance demands in each group according to the planning priority planning parameter. The planning priority planning parameter identifies the priority of the cycle with respect to planning. As described below, scheduler 155 plans (835) the slot group up to the end of the specified planning horizon (e.g., two-year window), scheduling (835) all of the same priority group together (e.g., the group with the highest priority), and then scheduling (835) the next priority group (e.g., the group with the next highest priority). Although scheduler 155 plans (835) all maintenance of the same priority concurrently for faster performance, for example and clarity, the descriptions below illustrate the planning of a single order.

Each maintenance demand has a certain valid time range for planning its associated maintenance order. Scheduler 155 calculates (830) the valid time ranges for scheduling the associated maintenance order. This time range is based on the date where utilization is 100% (i.e., the NEP) after which the aircraft is out-of-compliance), the end date of the last planned maintenance order, and the minimum and maximum utilization set by a user. Scheduler 155 uses these parameters to calculate a tolerance window for planning a maintenance order including an earliest start date, a target start date, and latest start date, base on the NEP date.

With this data determined, scheduler 155 schedules (835) slot orders and/or maintenance orders. As described above, slot orders are orders take up a bay for a given period of time. Physically, one bay accommodates one aircraft, so only one slot order can reserve aircraft bay space at one point of time. Therefore, scheduler 155 initially schedules (835) each slot finitely. In other words, scheduler 155 does not overlap slots. If this fails (e.g., aircraft bay is already used in the given time period), scheduler 155 reacts according to an error handling planning parameter of the relevant maintenance demand. If this parameter is set to 'Schedule the order to target utilization date', scheduler 155 infinitely schedules (835) the slot (e.g., overlaps slot orders) to the target utilization date of the maintenance demand. By default, scheduler 155 infinitely schedules (835) maintenance orders (e.g., overlaps maintenance orders).

Figure 9:
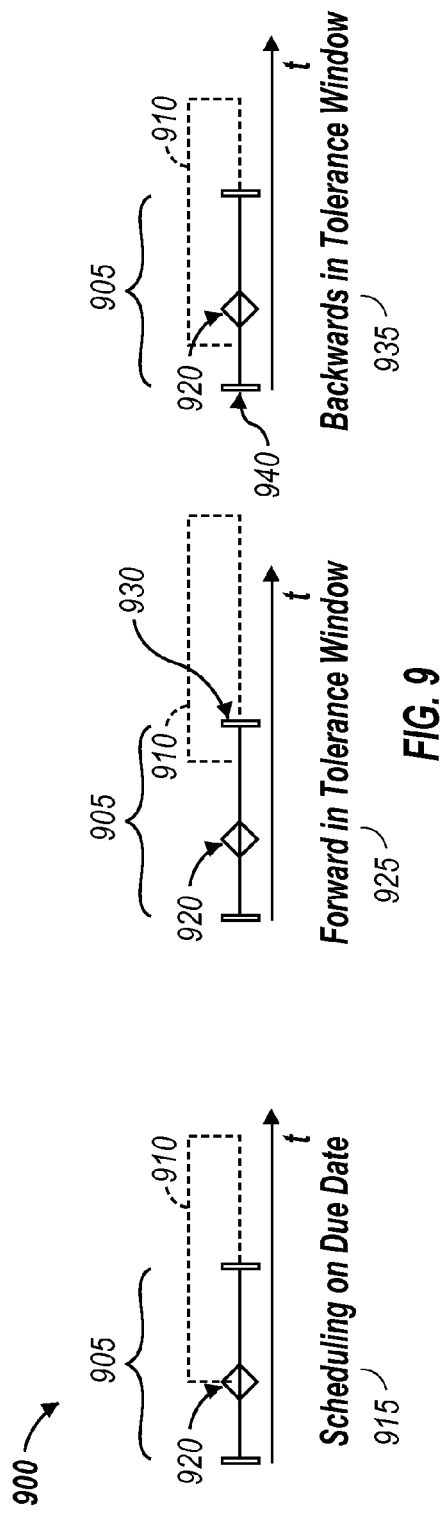
FIG. 9 shows a block diagram of a process for scheduling orders.

FIG. 9 illustrates an example process 900 scheduler 155 uses to automatically schedule a slot and/or maintenance order. When automatically scheduling a slot and/or maintenance order, scheduler 155 schedules an order 910 so that the start date is inside the tolerance window 905 of the corresponding maintenance demand. Scheduler 155 first attempts to schedule (915) the order 910 on the target due date 920. If that is not possible, scheduler 155 attempts to schedule (925) the order 910 forward of the target date 920, between the target date 920 and the maximum utilization date 930. If that is not possible, scheduler 155 attempts to schedule (935) the order 910 backward of the target date 920, between the target date 920 and the minimum utilization date 940. If scheduler 155 cannot finitely schedule order 910, scheduler 155 infinitely schedules order 910 at target date 920 and issues an alert.

Referring back to FIG. 8, when scheduler 155 plans (835) maintenance orders, scheduler 155 can plan (835) planning types differently, depending on whether the planning type is major (840), minor (845), or packaging (850). A major planning type relates to those maintenance demands that are long in duration (e.g., measured in weeks) and have a low frequency (e.g., measured in years). In this planning type, scheduler 155 attempts (840) to create a new slot for each maintenance demand. If scheduler 155 creates (840) a slot, scheduler 155 schedules (840) a maintenance order associated with the maintenance demand on the start date of the created slot and assigns (840) the maintenance order to the slot.

Figure 10:
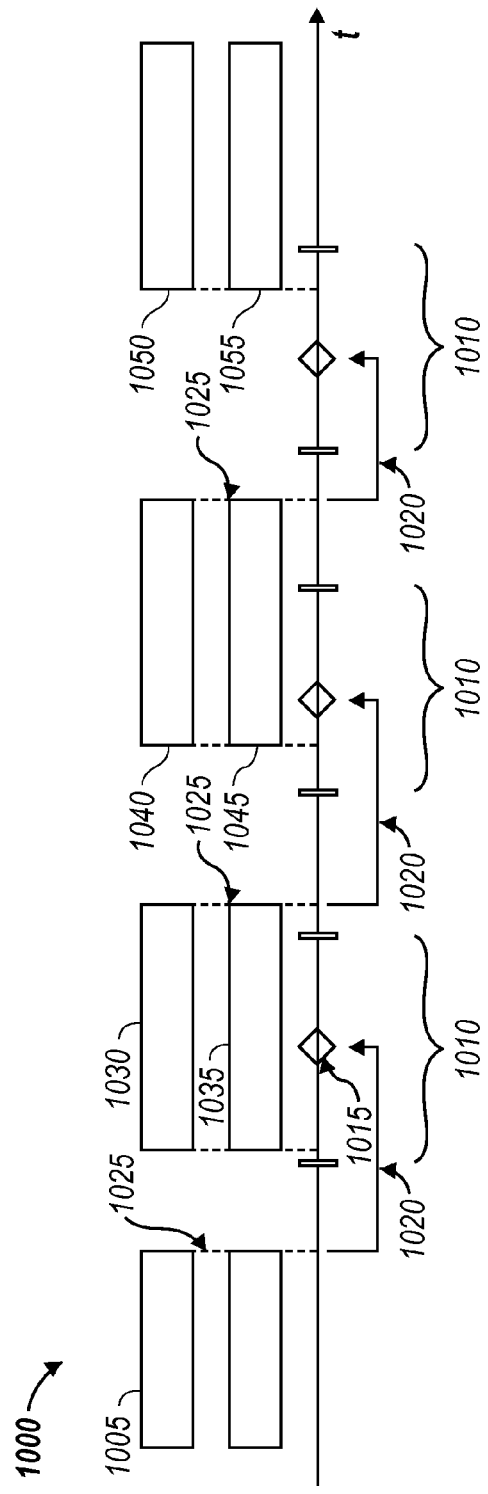
FIG. 10 shows a block diagram of a process for scheduling major type orders.

FIG. 10 illustrates an example process 1000 scheduler 155 uses to schedule (840) major planning type orders. Scheduler 155 forecasts the next demand (with tolerance window 1010) on an object level for one maintenance cycle. Scheduler 155 forecasts the next demand 1005 using a target utilization 1015, a maintenance interval definition 1020 and an end date 1025 of previously scheduled order/package. Using the automated technique above, scheduler 155 attempts to schedule a slot order 1030 for the forecasted demand. Scheduler 155 generates an alert for the demand if the slot 1030 has to be scheduled infinitely. When slot 1030 is scheduled, scheduler 155 schedules maintenance order 1035 into slot 1030. Scheduler 155 repeats this process to schedule slot 1040 and once scheduled, to schedule associated maintenance order 1045. Scheduler 155 again repeats this process to schedule slot 1050 and once scheduled, to schedule associated maintenance order 1055.

Referring back to FIG. 8, scheduler 155 can perform different processes for minor planning (845) for the planning selection. A minor planning type relates to those maintenance demands that are short in duration (e.g., measured in hours/days) and have a high frequency (e.g., measured in weeks/months). In this planning type, scheduler 155 attempts (845) to find an existing slot for each maintenance demand. If scheduler 155 finds (845) a slot, scheduler 155 schedules (845) a maintenance order associated with the maintenance demand on the start date of the found slot and assigns (845) the maintenance order to the slot.

FIG. 11 illustrates an example process 1100 scheduler 155 uses to schedule (845) minor planning type orders. Scheduler 155 reads maintenance item and task list associated with the minor maintenance demand. Scheduler identifies valid free slots 1105$a$-$d$ for the given maintenance item/task list. For example, a slot for an A-Check of an A320 aircraft. Scheduler 155 forecasts the next demand (with tolerance window 1110). When a slot is found that falls within tolerance window 1110, scheduler 155 schedules maintenance order 1115 into applicable slot 1105$c$. Scheduler 155 repeats this process to schedule any additional minor planning for the aircraft. Scheduler 155 generates an alert for the demand if slots 1105$a$-$d$ do not fall within the tolerance window 1110.

Referring back to FIG. 8, scheduler 155 can perform different processes for packaging planning (850) for the planning selection. A packaging planning type relates to those maintenance demands that are typically associated with their own life cycle control. For example, this can include corrosion checks for a corrosion prevention and control program ("CPCP"), checks for components and the like. In this planning type, scheduler 155 attempts (850) to find an existing scheduled maintenance order for the associated aircraft. If scheduler 155 finds (850) a maintenance order, scheduler 155 schedules (850) a maintenance order associated with the packaging maintenance demand on the start date of the found maintenance and assigns (850) the maintenance order to the existing work package.

FIG. 12 illustrates an example process 1200 scheduler 155 uses to schedule (850) packaging planning type orders. Scheduler 155 finds appropriate maintenance orders for the demand to be scheduled. For example, scheduler 155 checks aircraft identifier (e.g., NYA). Scheduler identifies any existing maintenance order 1205 for the given aircraft. Scheduler 155 forecasts the demand (with tolerance window 1210). If slot 1215, associated with the identified maintenance order 1205, is within tolerance window 1210, scheduler 155 schedules maintenance order 1220 into applicable slot 1215. Scheduler 155 adjusts the duration of slot 1215 as needed to incorporate maintenance order 1220 and as allowable by neighboring scheduled slots 1225 and 1230. Scheduler 155 repeats this process to schedule any additional packaging planning for the aircraft. Scheduler 155 generates an alert for the demand when no applicable slots are identified.

Figure 13:
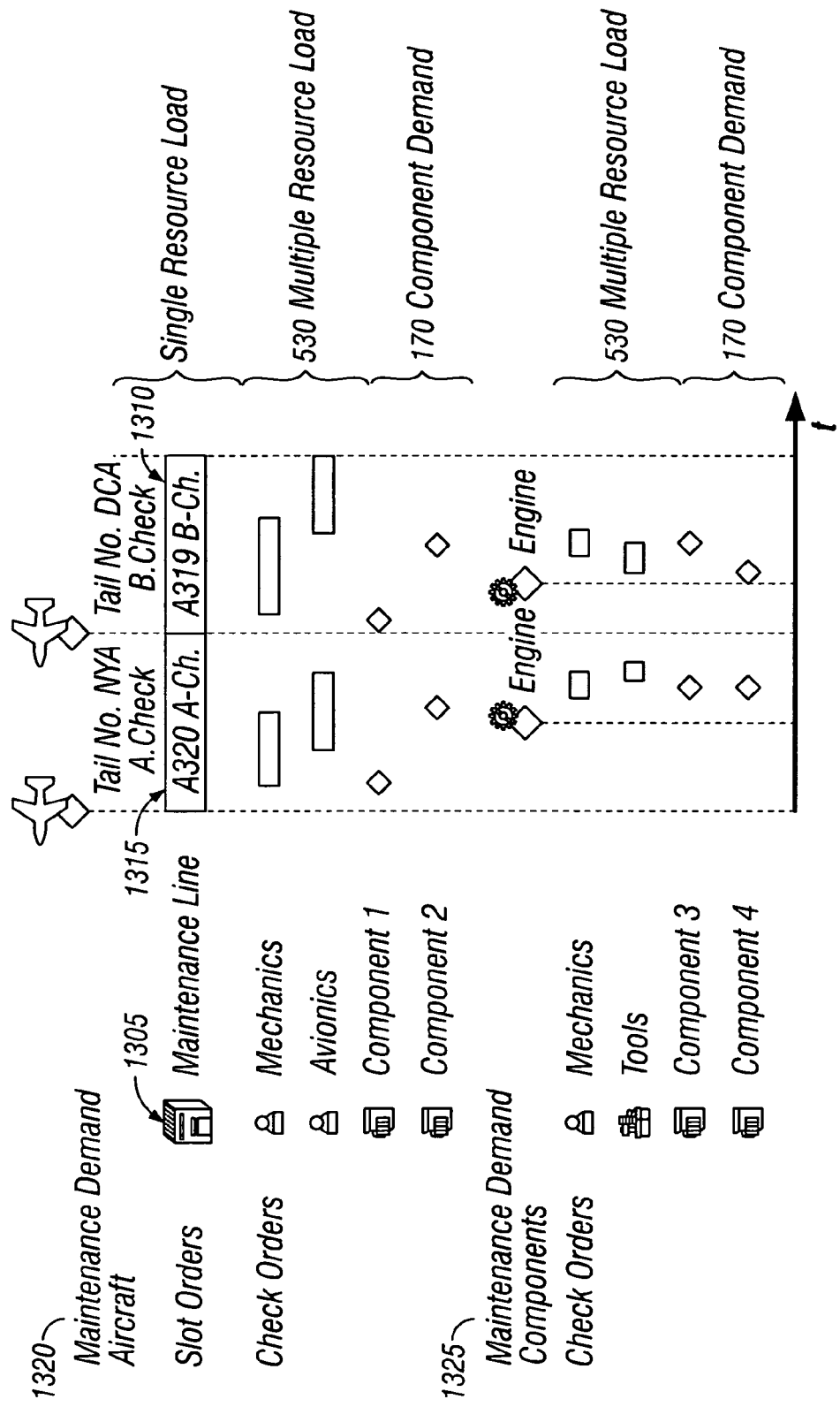
FIG. 13 shows a block diagram of a portion of a plan.

As scheduler 155 schedules many different aircraft, scheduler 155 maximizes the use of the bay resources. For example, FIG. 12 includes gaps between slots 1215, 1225, and 1230, for clarity. FIG. 13 illustrates another example of a portion 1300 of a plan 160 of a bay resource 1305. In this portion, slot order 1310 immediately follows slot order 1315. Portion 1300 shows work packages with both aircraft maintenance demands 1320 and component maintenance demands 1325.

Figure 14A:
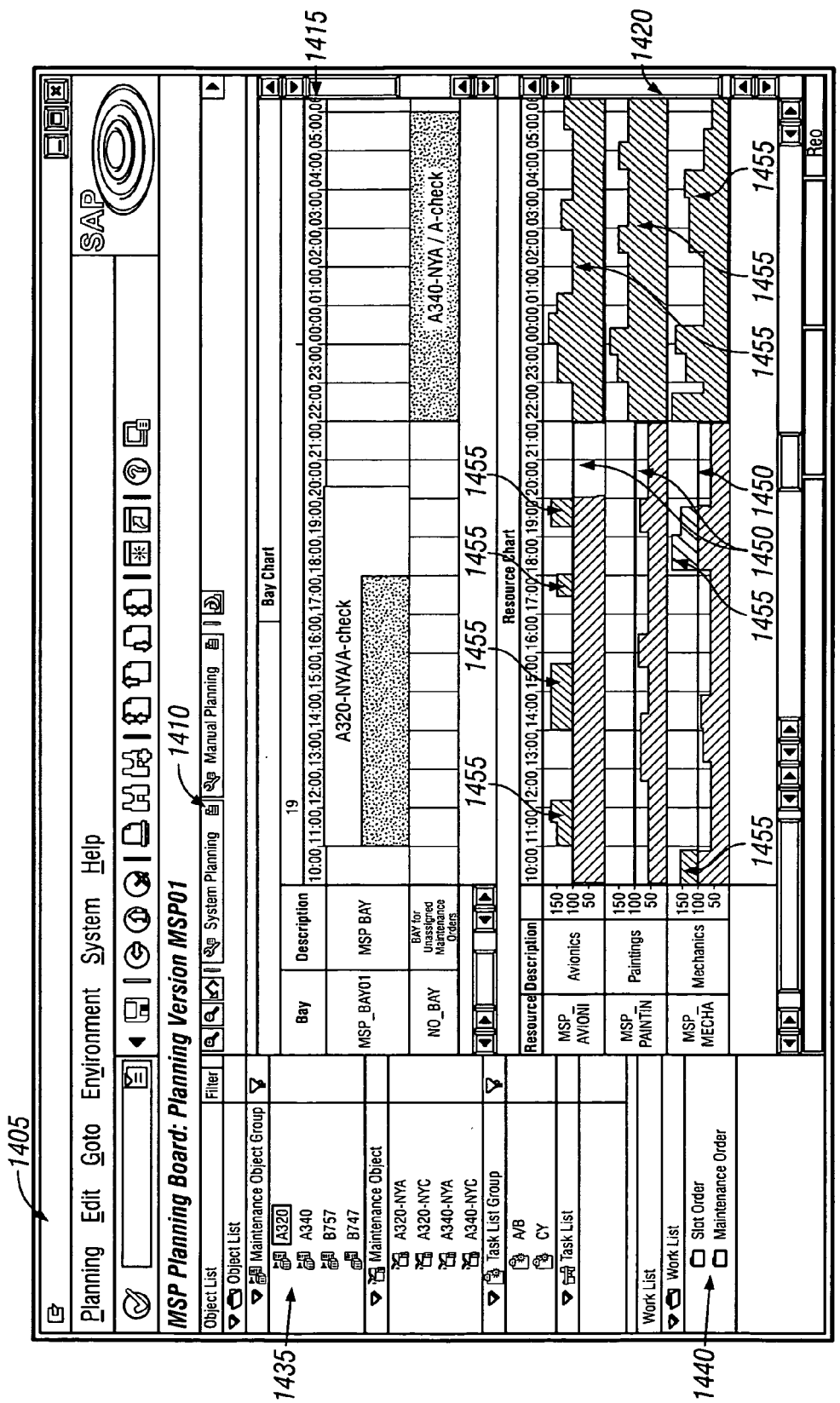
FIG. 14 shows a screenshot of a user interface.
Figures 14, 14B:
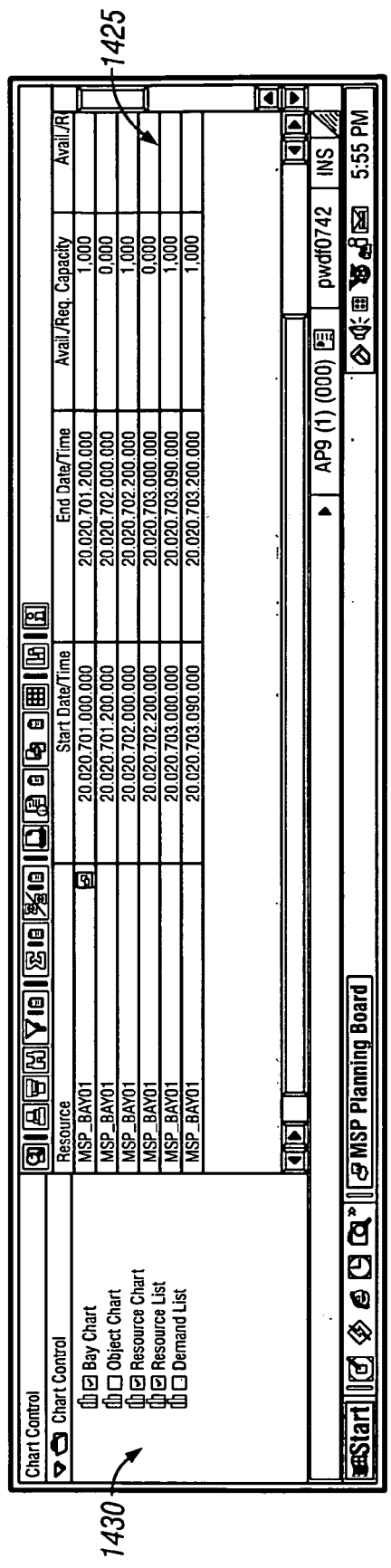

FIG. 14 illustrates an example screen shot 1400 that user interface 150 can display. Screen shot 1400 includes an application menu 1405 and a main toolbar 1410. Screen shot 1400 also includes object list area 1435 and worklist area 1440 to enable a user to search for specific objects in the display. In one example, the user can use areas 1435 and 1140 to modify the parameters of model 125 to generate different versions of plan 160, as described above. Screen shot 1400 also includes chart areas 1415, 1420, and 1425 in which user interface 150 displays portions of the plan 160 and/or model 125. A user uses check boxes in chart selection 1430 to control what which user interface 150 displays in chart areas 1415, 1420, and 1425. In the illustrated example, chart area 1415 includes a bay chart, chart area 1425 includes a resource list, and chart 1420 includes a resource chart. In chart area 1420, there are resource capacity indicators 1450. Any planned tasks requiring resources greater than capacity are indicated by different colored areas 1455, to quickly identify to a user plans that lack necessary resources.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus, and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), a wireless WAN, and the Internet.

The computing system can include clients and servers. A client and server are generally remote from each other and typically interact through a communication network. The relationship of client and server arises by virtue of computer programs running on the respective computers and having a client-server relationship to each other.

Alternatives

Although only a few examples have been described in detail above, other modifications are possible. For example only and not to limit all of the possible alternatives in any way, the following describes additional variations to the examples described above. In the examples above, the operations system acted as a master system with the master data and the planning system acted as a slave system, generating revisions to the operations system data. In another example, the planning system can be the master and the operations system the slave. In yet another example, there is no master/slave relationship, but a database paradigm where all needed data is stored centrally and both systems have access and can make changes to the database using known database techniques.

The push and/or pull descriptions regarding the retrieval of data can also be changed. For example, instead of the planning system pulling operational data from the operations system, the operations system can push data to the planning system. In this example, the operations system, knowing when the operational data changes, can push the changed data to the planning system as soon as that data changes, ensuring the planning system is current. The logic flows depicted in FIG. 8 do not require the particular order shown, or sequential order, to achieve desirable results. For example, the planning of major, minor, and packaging types may be performed at many different places within the overall process. In certain implementations, multitasking and parallel processing may be preferable. Further, the techniques described herein are not limited to use with aircraft, but rather can be used to plan maintenance for any type of apparatus.

Other embodiments may be within the scope of the following claims.

What is claimed is:

1. A system comprising:
   a requirements manager executed by a processor comprising,
   a maintenance requirements repository having a plurality of respective maintenance demands for a plurality of maintenance items within an enterprise, each maintenance demand having a type, a maintenance history repository having a plurality of respective historical maintenance data for the plurality of maintenance items, and a work package generator configured to generate a work package associated with the plurality of maintenance items based on the maintenance demands and the historical maintenance data, each work package associate with an existing specific entity within the enterprise; and a planning manager in communication with the requirements manager, the planning manager comprising, a model generator configured to accept hypothetical entities and generate plurality of models, each model in the plurality of models is based at least in part on a plurality of parameters that define locations, maintenance items, resources, cycles, and average performance, each parameter in the plurality of parameters is adjustable to reflect a hypothetical scenario, each model in the plurality of models represents a different hypothetical scenario simulating operational data, the models conforming to a same data structure as the operational data, and a storage device that includes a first planning object having a first value associated with an out of compliance parameter, a second value associated with a maximum utilization parameter, the second value being less than the first value, a third value associated with a minimum utilization parameter, the third value being less than the second value, and a fourth value associated with a target utilization value, the fourth value being less than the second value and greater than the third value and indicating when a maintenance demand is due, a planning engine configured to receive the maintenance demands and the historical maintenance data, to generate a plan based on the maintenance demands, the historical maintenance data, and a model in the plurality of models, and to transmit at least a portion of the plan to the work package generator, the planning engine to assign priorities to the different maintenance demands based, at least in part, on the demand, and wherein the planning engine is configured to determine whether a slot exists for the maintenance demand where the slot comprises a start date between the second and third values, inclusive.

2. The system of claim 1 wherein the planning manager further comprises a user interface configured to enable a user to modify the plurality of parameters associated with the model.

3. The system of claim 1 wherein the planning manager further comprises a user interface configured to enable a user to modify a parameter associated with the planning engine.

4. The system of claim 3 wherein the parameter is associated with a start date of the plan and an end of the plan.

5. The system of claim 1 wherein the planning engine further comprises a revisions generator that revises a work package based on a modification of the plan.

6. The system of claim 1 wherein the requirements manager further comprises an operations manager configured to determine an operating schedule of each maintenance item, the operating schedule including a geographical location.

7. The system of claim 1 wherein the plurality of maintenance items comprise aircraft.

8. The system of claim 1 wherein the locations comprise an aircraft bay.

9. The system of claim 1 wherein the resources comprise an avionics personnel, a painter, and a mechanic.

10. The system of claim 1 wherein the planning manager first attempts to plan all maintenance demands using finite scheduling and uses infinite scheduling if no solution is possible using finite scheduling.

* * * * *